United States Patent Office 3,379,587
Patented Apr. 23, 1968

3,379,587
INORGANIC OXIDIZER SALT BLASTING SLURRY COMPOSITION CONTAINING FORMAMIDE
Melvin A. Cook, Salt Lake City, Utah, assignor to Intermountain Research & Engineering Company, a corporation of Utah
No Drawing. Continuation-in-part of application Ser. No. 422,034, Dec. 29, 1964, which is a continuation-in-part of application Ser. No. 378,965, June 29, 1964. This application Mar. 22, 1966, Ser. No. 536,303
4 Claims. (Cl. 149—39)

This invention relates to blasting agents and more particularly to slurry blasting agents.

This application is a continuation-in-part of application Ser. No. 422,034, filed Dec. 29, 1964, now abandoned, which in turn was a continuation-in-part of Ser. No. 324,193, filed Nov. 18, 1963, now abandoned. It is also a continuation-in-part of application Ser. No. 378,965, filed June 29, 1964, now Patent No. 3,282,753, which in turn was a continuation-in-part of Ser. No. 52,369, filed Aug. 29, 1960, now abandoned.

The term slurry, as employed herein, refers to a flowing or pumpable liquid-solid mixture containing sufficient liquid to render the liquid phase essentially continuous. Thus, the slurries of this invention have a continuous or substantially continuous liquid phase with particulate solids uniformly dispersed therein, as distinguished from a mass of wet or moistened solids which do not form a slurry. The liquid phase or menstruum may be of any desired viscosity, from thin or low viscosity liquids to viscous liquids or liquids thickened with colloids to gelled condition. In the latter case, the gelatinous liquid phase must be continuous, or substantially so, in order for the composition to fall within the above definition of a slurry. At the same time, the slurry should be sufficiently thick or viscous to prevent substantial gravitational separation of the suspended solid particles from the liquid menstruum.

A slurry within the above definition theoretically has a density determined essentially by the densities of the individual solid and liquid constituents and the relative proportions of such constituents. In practice, however, it is often difficult if not impossible to achieve the full theoretical density, particularly in slurries of high viscosity or gelled liquid component, because of air entrapment. However, a lowering of the density, by air entrapment, of up to ten percent or so of the slurry volume still produces compositions that are slurries, having essentially continuous liquid phases. The density of a given slurry, other things being equal, is a measure of air entrapment, one criterion for continuity of the liquid phase. For present purposes, a composition with density lower (because of air entrapment) than about ninety percent of theoretical value, would not be considered to have a continuous liquid phase. However, it is not intended to restrict this invention to slurries having 90% or more of theoretical density; after a slurry is once formed its density may be lowered artificially, with the spirit of this invention, by adding gas and/or light bulky materials, should it be desirable to do so. The present invention contemplates also gelled or thickened slurries which may be stiff and/or too viscous to flow or to be pumped, as well as flowing or pumpable slurries.

Aqueous slurry blasting agents comprising water, oxidizer and solid explosive fuels or sensitizers, especially high explosives or propellants, e.g. TNT, etc., such as described in Cook and Farnam U.S. Patent 2,930,685 may be improved by incorporating liquid fuels or extenders therein. This applies also to slurries containing non-explosive fuels or sensitizers such as aluminum, as described in U.S. Reissue Patent No. 25,695. Carbonaceous sensitizers (fuels) may be used. Water content is partly replaced by one or more liquids having useful slurrying properties and fuel value, too, with special benefits, according to the present invention. Compositions containing as little as 5% water or less at room temperature particularly, require liquid extenders where full advantages of slurry type materials are sought. Without extenders they are not pumpable and do not really have a continuous liquid phase. Even with as much as 10% water or more supplemental liquids or extenders are often very advantageous to give slurry stability and improve flow, handling and blasting performance at low temperatures.

The minimum sensitizer content of slurries such as those described in Patent 2,930,685 is usually about 15% of coarse granular or pelleted TNT or equivalent for blasting agents sensitive enough to be commercially useful. With some explosive sensitizers such as granular smokeless powder a minimum of about 20% of such sensitizer is required to yield a true slurry that is sensitive enough to be commercially practical and detonable by low cost boosters. Similarly, such smokeless powder slurries require a minimum of about 11% water at ordinary temperatures to yield true slurries. Lower quantities of water are often desirable for various reasons and this invention makes such possible.

It is one object of this invention to make slurry blasting agents containing smaller amounts of explosive or non-explosive sensitizers than prior art compositions, which are also more economical than prior art compositions, while still retaining the highly desirable slurry structure, which is pumpable or flowing, with essentially continuous liquid phase but with relatively low water content.

It is a further object of this invention to provide blasting agents which possess superior properties including a relatively rather high density, high bulk strength, good water resistance, and high resistance to freezing, e.g. at temperatures as low as $-10°$ F. or lower, along with satisfactory sensitivity.

Another object is to incorporate liquids or liquid extenders in limited quantities of water, or in lieu of water, which add fuel or energy value to the composition.

A still further object is to prepare compositions which have good resistance against water intrusion or leaching while still retaining a true slurry structure. By slurry structure, as indicated above, it is intended to mean that the liquid phase is always continuous, or essentially so with enough liquid to wet substantially all the solids and/or keep them in suspension but it is to be understood that the liquid may be a thickened liquid or so-called gel.

Further objects and advantages will be apparent to those skilled in the art as this description proceeds.

According to this invention, aqueous or water-containing slurries may be made with normal densities as high as 1.3 grams/cc., or higher. They may contain less water than normally necessary to make a slurry, e.g. as little as 5% or less by weight, or they may contain substantially more than 5% water. These slurries have high bulk strength and despite their high density, which usually reduces sensitivity, they are sensitive enough to be detonated by relatively small inexpensive boosters. The liquid phase in such improved slurries, preferably comprises somewhat less water than required for slurrying plus one or more water-soluble organic substances which extend the liquid phase. The total solvent preferably is capable of dissolving at least its own weight of inorganic oxidizer salt at ambient temperatures. Suitable organic extenders are the lower alcohols, e.g. methyl, ethyl, isopropyl, polyhydric alcohols, especially ethylene glycol, diethylene glycol, propylene glycol, glycerol, even alcohol ethers, and the solution may include sugars and the like. The oxidizer salts which may be employed, are ammonium nitrate, and/or sodium nitrate, but may include barium nitrate, sodium chlorate, or the usual perchlorates, especially ammonium perchlorate. The alkali metal chlorates and perchlorates may be used, with suitable precautions, as set forth in applications Serial Nos. 52,369 and 378,965. Polar organic materials that are normally liquid are preferred, but they may include aqueous or organic solutions of solids such as sugars which serve to extend the fluidizing action. The lower aliphatic monohydric alcohols such as methyl, ethyl and isopropyl alcohol; ethylene glycol and glycerol are specificall preferred. Sugars such as sucrose, maltose and dextrose, in aqueous solution, may be used. Other compounds that are normally liquid and useful as fluidizers are the lower molecular weight amides such as formamide, dimethyl formamide, and acetamide. Urea and amines of suitable molecular weight such as ethanolamine, guanidine and dicyandiamine can be used.

The slurries contain from about 2 to 10%, even up to 15% or more, of water, preferably 2 to 4.5%, especially where larger quantities of the organic extender compound are used, plus about 0.25 to 14%, preferably 0.25 up to 10% but in some cases up to 18% by weight of the organic substance.

The sensitizers for these slurry explosives may comprise one or more self explosives such as coarse grained TNT, RDX, smokeless powder, any of the "tols," e.g. Composition B (RDX/TNT/wax), PETN, nitrostarch, tetryl Haleite, pentolites (PETN/TNT), ednatols (EDNA/TNT), etc. Smokeless powders may be single, double and/or triple-base. The single base smokeless powders contain predominately nitrocellulose; the double-base smokeless powder propellants contain also nitroglycerine, but are still predominantly nitrocellulose. The triple-base smokeless powders contain, in addition to nitroglycerine and nitrocellulose an insoluble solid explosive. For example, the flashless (triple base) propellant type designated in the U.S. military publications as M15, which contains about 55% nitroguanidine together with nitrocotton/nitroglycerine in the ratio of 20/19 may be used. Other triple base smokeless powders may be used such as those that contain in addition to nitrocellulose and nitroglycerine such explosives as RDX and HMX. All these materials are fuels and tend to take up oxygen from the oxidizers. Slurry explosives made according to this invention may be sensitized also with non-explosive materials, especially aluminum or other heat producing metals such as magnesium. Finely divided coal, gilsonite and other carbonaceous particulate solids may be used as fuels, with or without aluminum. However, the use of aluminum, preferably in finely divided form and in quantities of 0.1 to 5% of the total slurry, or up to 40% or more if coarse aluminum is included, is particularly preferred.

When explosive sensitizers are used, they are preferably particulate and preferably in the range of particle size from minus 4 to plus 30 mesh, although other formulations of finer grain size may be useful, though usually less effective. The sensitizer may also comprise any suitable combination of explosive and/or non-explosive substances.

The liquid phase of the slurry explosives of this invention may be regulated as to viscosity by incorporation therein of various hydrophilic colloids including guar gum, the water soluble carboxymethyl cellulose, starch, flour from various sources such as wheat, potato, tapioca, and other suitable hydrophilic colloids. The liquid phase may likewise be thickened or gelatinized by the addition of a suitable cross-linking agent such as borax or a dichromate, e.g. in the case of guar gum or the flours and starches. Such thickeners or gelling agents are usually present in amounts of 0.2 to 2% by weight but larger proportions, up to 6% or so may be used, particularly of those that are less effective as thickeners.

Example I

To show the comparative properties of slurry explosives made according to this invention with those of prior art, the results shown in Table I were obtained using a Composition: TNT—14%, ammonium nitrate—59%, sodium nitrate—10%, sulfur—2.0%, cross-linking borated guar gum—0.5%, water—4.5% and various organic liquids—10%. These were compared with a standard slurry prepared according to the general procedure described in Patent 2,930,685 containing 16% TNT, 59% ammonium nitrate, 8% sodium nitrate, 2% sulfur, 0.5% cross-linking guar gum and 14.5% water. In all cases the TNT was coarse granular material having a particle size of minus 4 to plus 20 mesh.

TABLE I

| Organic Liquid | Standard (none) | Isopropyl Alcohol | Formamide | Ethylene gylcol | Glycerine |
|---|---|---|---|---|---|
| Percent | (¹) | 10 | 10 | 10 | 10 |
| Slurry density (g./cc.) | 1.38 | 1.38 | 1.34 | 1.30 | 139 |
| Critical diameter unconfined using 380 g. cast pentolite booster (in.) | 6 | 6 | 4 | 4 | 4 |

¹ 14.5% water only.

While the slurry made with isopropyl alcohol was not appreciably better than the standard so far as sensitivity is concerned, there was a substantial improvement in sensitivity in the others, resulting from the substitution of 10% either formamide, ethylene glycol or glycerine for 10% of the 14.5% water. Furthermore, all the slurries with organic additives had lower freezing points. In general, these slurries also had better water resistance than the standard water slurry, probably because the guar gum swelled more effectively. The TNT slurry explosives of prior art were found to require about 5% more TNT to sensitize them to the same level as that of the slurries made with 10% of either formamide, ethylene glycol or glycerine.

Example II

A composition was made up to 75 mm., M-1 smokeless powder—25 parts, ammonium nitrate—43 parts, sodium nitrate—10 parts, sulfur—2 parts water—y parts as indicated, self-cross-linking guar gum—0.7 part and x-parts of organic liquid as indicated. Each of these was formed as an essentially unconfined charge and detonated to determine critical diameter, with results as indicated.

TABLE II

| Organic Additive | Formamide | 7/1 Formamide Ethylene glycol | Formamide |
|---|---|---|---|
| Parts | 10 | 10 | 9.5 |
| Parts Water | 4.5 | 4.5 | 2.0 |
| Density (g./cc.) | 1.46 | 1.46 | 1.36 |
| Critical Dia., in. (unconfined) | 5 | 5 | 5 |

TABLE II-A

| Organic Additive | 8/5 Formamide/ Molasses | Glycerine | Ethylene Glycol |
|---|---|---|---|
| Parts | } 14 | 10 | 10 |
| Parts Water* | | 4.5 | 4.5 |
| Density | 1.26 | 1.42 | 1.42 |
| Critical Dia., in. (unconfined) | 4 | 5 | 5 |

*The molasses was about 80% water.

In most cases these improved slurry explosives appeared to be better not only in sensitivity, but also in plasticity, swelling of the gum, and in freezing point, than the corresponding slurries using all water as the solvent.

Compositions containing less than 5% water together with suitable amounts of organic material soluble in the water as described above, appear also to produce slurry explosives of equal or better sensitivity and gelation properties than the original all water-solvent slurries when smokeless powder is the sensitizer. Table III shows results with various $x$ and $y$ values (organic solvent=$x$ parts and water=$y$ parts).

TABLE III.—APPROXIMATE ORGANIC SOLVENT REQUIREMENT FOR HIGH DENSITY SLURRY EXPLOSIVE FORMULATION

| Solvent | x | y | Solvent | x | y |
|---|---|---|---|---|---|
| Formamide | 8.0 | 4.5 | Formamide | 9.5 | 2.0 |
| Ethylene Glycol | 9.0 | 4.5 | Propylene Glycol | 9.0 | 4.5 |
| Glycerine | 9.0 | 4.5 | Polysolvent EE | | |
| Glucose | 10.0 | 4.5 | (Methyl Cellosolve) | 9.0 | 4.5 |

In order to determine the approximate minimum water requirement for some compositions, several slurries were made using the general composition shown in Examples II and Table III except that the $x$ and $y$ values were varied more widely. Using either formamide or ethylene glycol as the organic liquid it was found that slurries were inferior and required excessive organic liquid when no water at all was used; the best results were obtained in both cases by the use of about 2 to 3 parts water in conjunction with these solvents. Thus at $y=2$ and $x=9.5$ for formamide the critical diameter was 5″ at a density of 1.36 g./cc. The density was increased to 1.45 g./cc. by increasing the formamide by only 1%, probably indicating more solvation of the nitrates. Two or three parts more ethylene glycol were required to obtain a good high density slurry than when formamide was used in mixtures with 2 to 3% water.

Various combinations of formamide with glycerine, ethylene glycol and sugar, and ethylene glycol and molasses, were studied with essentially similar results. For example, a 5/5/4.5 mixture of formamide/glycerine/water gave a slurry explosive of 4″ critical diameter at 1.3 g./cc., slightly more liquid phase being needed to obtain a density in the range of 1.45 to 1.5 g./cc. A mixture of 10 parts of 7/3/4.5 formamide/sugar/water yielded a slurry having a density of 1.46 and having a sensitivity comparable to those of the prior art all aqueous liquid slurries.

Example III

As further examples, additional compositions embodying the invention were made up, as follows:

(a) A composition of 51 parts by weight of ammonium nitrate, 9 parts of sodium nitrate, 3 parts of glycerine, 6.6 parts of a finely divided coal known specifically as "Leonardite," 6.925 parts of water, 0.120 part of guar gum as a thickener, and a small fraction of one percent, i.e. about 0.012% of a surfactant material, "Renex," was made up and detonated, or detonation was attempted, with various detonating devices as follows:

(b) A composition was made up of 74 parts by weight of sodium chlorate, 5 parts of glycerine, 21 parts of coal as above ("Leonardite") and 9 parts of water. When first mixed, this material showed an endothermic reaction; this became exothermic when the mixture was heated to about 115° C. It became strongly exothermic at 125° and exploded spontaneously at 240° C.

(c) Another composition was made up of 100 parts of ammonium nitrate, 7 parts of ethylene glycol, 7 parts of coal ("Leonardite") as above, and enough water to slurry. In one case, 335 cc. of water was used—this appeared to be too much water and the mix failed to detonate fully with a 3C booster when poured in a cardboard tube 7 inches in diameter and 42 inches high. The composition had a density of 1.39. The explosion left 4 inches of the material in the base of the tube.

(d) A composition similar to (a) above, was made up, except that no extender (glycerine) was added. It consisted of 85 parts by weight of U.S. coated ammonium nitrate, 15 parts of sodium nitrate, 13 parts of "Leonardite" coal, and 9 parts of water. It had a density of 1.2, as compared with density 1.4 (grams per cc.) for composition (a). In a nine inch column with a "3C" booster to detonate it, this mix failed whereas mix (a) exploded successfully with the same size booster and under identical conditions.

Example IV

For field testing three large and identical batches of explosive slurry were made up, according to the following formula. Parts shown are by weight:

|  | Percent |
|---|---|
| "Tretol B" (Composition B, reclaim) | 8.13 |
| TNT—granular | 8.13 |
| Run of mill aluminum (below 1/20 in.) | 12.2 |
| "101" aluminum (below 100 mesh) | 4.06 |
| E2 (Monsanto) ammonium nitrate | 34.1 |
| Sulfur—fine powdered | 2.44 |
| Arcadian sodium nitrate | 12.2 |
| "J-100" guar gum | 0.569 |
| Phosphate stabilizer | 0.3 |
| Water | 13.8 |
| Ethylene glycol | 4.06 |

This mixture was used successfully in large scale blasting. It has an oxygen balance of about −13% a pH about 5.0 and was liquid and pliable or pourable at about −10° F. It froze at −13° F. (−25° C.).

Example V

A composition was made up of 10 parts of 20-mesh 95% ferrosilicon as a sensitizer, 15% aluminum (10% coarse, 5% fine), 54% ammonium nitrate, 6% sulfur, 15% sodium nitrate, 0.6% guar gum, 5% ethylene glycol and 12% water. This had a density of 1.54 and fired successfully in a 5″ column. It had an oxygen balance of about −15% and a pH of about 5.5.

TABLE IV

| Shot No. | Shot Description | | | | Shot Results | |
|---|---|---|---|---|---|---|
| | Booster | Mix | Tube | Time | D or F | Remarks |
| 1 | 3C | Above | 5 x 25 | 2:05 | F | 10 in. left. |
| 2 | 3C | do | 6 x 36 | 2:12 | F | Do. |
| 3 | 3C | do | 9 x 18 | 2:22 | D | |
| 4 | 3C | do | 8 x 18 | 2:45 | F | Just the Base left. |

Conclusion=with guar gum the above mix has a 9″ $d_c$ (critical diameter).

Example VI

Still another example was made up of the following ingredients, by weight:

|  | Percent |
|---|---|
| Composition B | 8.54 |
| TNT | 8.54 |
| Fine aluminum powder | 4.27 |
| Coarser ground Al foil | 12.86 |
| An (Monsanto E-2) | 36.00 |
| SN | 12.82 |
| Guar gum ("J–100") | 0.514 |
| Propylene glycol | 2.56 |
| Water | 14.4 |
| Phosphate | 0.256 |

This composition was a very satisfactory blasting agent, closely similar in properties to Example IV, above.

Example VII

Three compositions were made up as follows:

|  | (1) | (2) | (3) |
|---|---|---|---|
| Amm. Nitrate, percent wt | 12.2 | 43.6 | 17.75 |
| Barium Nitrate | 22.9 |  | 19.60 |
| Sodium Nitrate | 3.05 | 9.7 | 14.7 |
| Smokeless Powder (8") | 30.5 | [1] 9.7 |  |
| TNT |  |  | 19.6 |
| Aluminum | 1.61 | 7.76 |  |
| Ferro Phosphorous |  | 7.76 | 11.75 |
| Sulfur |  | 1.94 |  |
| Water | 20.6 | 15.55 | 12.73 |
| Ethylene Glycol | 2.3 | 2.91 | 2.94 |
| Guar Gum A | 0.23 | 0.291 | 0.294 |
| Guar Gum B | 0.305 | 0.388 | 0.392 |
| Al Stabilizer | 0.23 | 0.291 |  |
| Density δ (g./cc.) | 1.54–1.6 | 1.43–1.47 | 1.77–1.82 |
| $d_c$ (in. at 15° C.) | 3 | 3 | 2½ |
| Oxyg. Bal. | −11.39 | −8.89 | −10.45 |
| pH | 6.2 | 6.2 | 6.2 |
| Freeze Temp., °F | −15 | −5 | −12 |

[1] 20 cm.

Example VII(1) had the lowest freezing temperature, and kept its critical diameter $d_c$ of 3" down to −6° C.

Example VIII

Another formulation was made up of 45.3% AN, 10% SN, 2% sulfur, 8% FeP, 8% granular aluminum, 12% smokeless powder, 2% ethylene glycol, 14% water, 0.2% guar gum A, 0.1% guar gum B and 0.3% aluminum stabilizer. It remained fluid during an extended bagging operation, whereas Example VII(2) tended to solidify over the same period of storage time.

Example IX

Three more compositions were made up as follows:

|  | (1) | (2) | (3) |
|---|---|---|---|
| AN | [1] 31.5 | [2] 41.7 | [3] 41.7 |
| SN | 10.0 | 9.6 | 13.5 |
| Barium Nitrate |  |  | 18.0 |
| S | 2.0 |  |  |
| FeP |  |  | 10.8 |
| Aluminum | 9.9 |  |  |
| S.P. | 8.6 | 33.7 | [4] 22.8 |
| Water | 17.6 | [5] 11.2 | 14.7 |
| TNT | 17.9 |  |  |
| Eth. Glycol | 3.0 | 2.9 | 2.7 |
| Guar B | 0.36 | 0.7 | 0.6 |
| Guar C | 0.13 |  |  |
| Stabilizer | 0.23 | 0.03 | 0.02 |
| Acid (HNO₃) |  | 0.13 | 0.12 |
| pH | 5.6–6.0 | 5.7 | 5.7 |
|  | 1.39 | 1.78 |  |

[1] Sat. sol. at 170° F.
[2] Sat. aq. sol. at 180° F.
[3] Sat. sol. at 185° F.
[4] 11.4 90 mm., 11.48 mm.
[5] Added.

The pH of the slurry is of importance with respect to gelling and gel stability. It is preferably kept slightly on the acid side, even if a small amount of nitric or other acid is needed for this purpose. A desirable range is between about 4.7 and 7.0 Ethylene glycol stabilizes such gels.

Overall, the preferred composition has at least 30% by weight of inorganic oxidizer, at least partially dissolved in liquid. This liquid comprises 2 to 30% water, 2 to 4.5% for cold weather, over 5%, preferably 8% or more is used otherwise, and 0.25 to 10%, up to 18%, of the organic liquid extended or fluidizing agent, the latter preferably being either ethylene glycol, formamide or alcohols which lower the freezing point. The slurry must contain sensitizer up to 40%, including suspended particulate fuel material to bring oxygen balance between −25 and +10% and sensitize the oxidizer to detonation in the presence of the liquid. The particulate matter may include aluminum with or without explosive materials like TNT, smokeless powder, or others named above, including mixtures. Unless the slurry is quite thick with suspended solids, a thickener for the liquid is provided, e.g. 0.2 to 5% guar gum, or equivalent, to prevent gravitational separation of the suspended solid particulate material. The latter may include undissolved oxidizer salt. Total oxidizer may include up to 60% or more ammonium nitrate, up to 40% of sodium nitrate, and/or other oxidizers named above.

Example X 60.8% AN, 10% SN, 3.5% S, 1% fine aluminum, 3% granulated aluminum, 1% gilsonite, 12.5% water, 5% formamide, 0.5% guar gum, and 0.2% aluminum stabilizer. This thickened rapidly, in less than 3 minutes, without use of a cross-linking agent and without settling of suspended particles.

Remarks: Composition XI-A was of sloppy wet consistency but no segregation of suspended solids. In XI-E sodium dichromate was used for cross linking.

Example XI

Several compositions were made up as follows, using propylene glycol (PG) as the organic liquid extender. Percentages given are by weight:

|  | A | B | C | D | E |
|---|---|---|---|---|---|
| AN (percent) | 42.3 | 42.3 | 42.3 | 42.3 | 42.3 |
| SN | 10.0 | 10.0 | 10.0 | 10.0 | 10.0 |
| SP (20 mm.) | 12.5 | [1] 5.0 | 12.5 | 10.0 | 12.5 |
| SP (20 mm.) | [2] 12.5 | [1] 10.0 | 12.5 | 10.0 | 12.5 |
| P.G. | 3.0 | 3.0 | 3.0 | 3.0 | 3.0 |
| Guar | 0.7 | 0.7 | 0.7 | 0.7 | 0.7 |
| Water | 17.0 | 19.0 | 10.0 | 17.0 | 19.0 |
| Borax |  |  | 0.03 | 0.03 | 0.2 |
| $d_c$ (in.) | 3.0 | 4.0 | 4.0 | 5.0 | [3] |
| δ(g./c.c.) | 1.46 | 1.47 | 1.46 | 1.40 | 1.45 |
| Hydrate time (min.) | 20 |  | 5 | 5 | 15 |

[1] 75 mm.  [2] 1.1 mm.  [3] NA₂CR₂O₇.

Example XII 10 parts each of Composition B and TNT, 15 parts of granular aluminum, 5 parts of fine aluminum powder, 42 parts of ammonium nitrate, 3 parts of sulfur, 15 parts sodium nitrate, 0.7 part guar gum, 17 parts water, 5 parts ethylene glycol, and 0.3 part aluminum stabilizer were made up with a slurry of good consistency having a critical diameter of 3 inches and a density of 1.54 g./cc. The water temperature, before mixing, was 47° C. Final mix temperature was 20% C. and consistency good —pH 4.7. At —2° C., it was of rather hard consistency but still workable and pH was still 4.7.

What is claimed is:

1. A water bearing explosive composition in slurry or gel form which remains fluid at a low temperature, comprising a blend of (a) at least one water-soluble inorganic oxidizer salt, (b) at least one fuel capable of improving sensitivity of the composition, (c) water, and (d) a sufficient amount of formamide, up to 10% by weight of the total composition, to lower the freezing point of said composition, said formamide and water together forming a solvent for said oxidizing salt capable of dissolving at least its own weight of said salt thereby to form a substantially continuous liquid phase in said composition.

2. Composition according to claim 1 which contains a hydrophilic colloidal thickener.

3. Composition according to claim 2 wherein the hydrophilic colloidal thickener is guar gum.

4. Composition according to claim 2 wherein the thickener is cross-linked with a cross-linking agent.

References Cited

UNITED STATES PATENTS

| | | | |
|---|---|---|---|
| 3,190,777 | 6/1965 | Breza et al. | 149—46 X |
| 3,235,423 | 2/1966 | Ferguson | 149—38 |

L. DEWAYNE RUTLEDGE, *Primary Examiner.*

BENJAMIN R. PADGETT, CARL D. QUARFORTH, *Examiners.*

S. J. LECHERT, JR., *Assistant Examiner.*

UNITED STATES PATENT OFFICE
CERTIFICATE OF CORRECTION

Patent No. 3,379,587                                April 23, 1968

Melvin A. Cook

It is certified that error appears in the above identified patent and that said Letters Patent are hereby corrected as shown below:

In the heading to the printed specification, line 9, cancel "Ser. No. 378,965, June 29, 1964" and insert -- Ser. No. 324,193 filed November 18, 1963, now abandoned --. Column 1, lines 17 to 21, cancel, "It is also a continuation-in-part of Ser. No. 378,965, filed June 29, 1964, now Patent No. 3,282,753, which in turn was a continuation-in-part of Ser. No. 52,369, filed August 29, 1960, now abandoned."

Signed and sealed this 2nd day of March 1971.

(SEAL)
Attest:

Edward M. Fletcher, Jr.                          WILLIAM E. SCHUYLER, JR.
Attesting Officer                                    Commissioner of Patents